United States Patent [19]
Cain et al.

[11] Patent Number: 5,912,042
[45] Date of Patent: *Jun. 15, 1999

[54] FAT BLENDS CONTAINING DIGLYCERIDES

[75] Inventors: Frederick William Cain, Voorburg; Adrianus Jozef Kuin, Schiedam, both of Netherlands; Anne Cynthia Peilow, Northampton; Paul Thomas Quinlan, Bedford, both of United Kingdom

[73] Assignee: Loders Croklaan B.V., Wormerveer, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/687,613

[22] PCT Filed: Feb. 2, 1995

[86] PCT No.: PCT/EP95/00386

§ 371 Date: Aug. 8, 1996

§ 102(e) Date: Aug. 8, 1996

[87] PCT Pub. No.: WO95/22257

PCT Pub. Date: Aug. 24, 1995

[30] Foreign Application Priority Data

Feb. 18, 1994 [EP] European Pat. Off. ............ 943 01 162

[51] Int. Cl.$^6$ ................ A23D 7/00; A23D 9/00
[52] U.S. Cl. ........................... 426/607; 426/601
[58] Field of Search ................... 426/601, 607, 426/608, 611

[56] References Cited

U.S. PATENT DOCUMENTS

| | | | |
|---|---|---|---|
| 3,878,231 | 4/1975 | Harwood | 426/607 |
| 4,018,806 | 4/1977 | Wyness | 426/607 |
| 4,656,045 | 4/1987 | Bodor | 426/607 |

FOREIGN PATENT DOCUMENTS

| | | |
|---|---|---|
| 0 171 112 | 2/1986 | European Pat. Off. . |
| 0 378 893 | 7/1990 | European Pat. Off. . |
| 0 402 090 | 12/1990 | European Pat. Off. . |
| 0 417 562 | 3/1991 | European Pat. Off. . |
| 0 425 958 | 5/1991 | European Pat. Off. . |
| 91/08677 | 6/1991 | WIPO . |

OTHER PUBLICATIONS

Derwent Abstract, JP–A–5 161 471.

*Primary Examiner*—Carolyn Paden
*Attorney, Agent, or Firm*—Pillsbury Madison & Sutro LLP

[57] ABSTRACT

Fat-blends suitable for food applications are disclosed. These blends contain 10–60% diglycerides (A), 90–40% triglycerides (B) wherein (A) contains $\geq 70\%$ SU-diglycerides, including high melting diglycerides (>40° C.)(C) and simultaneously a fatty compound (D) so that the melting point of (C+D) is >5° C., lower than the melting point of (C) wherein (B) has an $N_5 \leq 40$ while the total blend has a SAFA-content <40%.

12 Claims, 1 Drawing Sheet

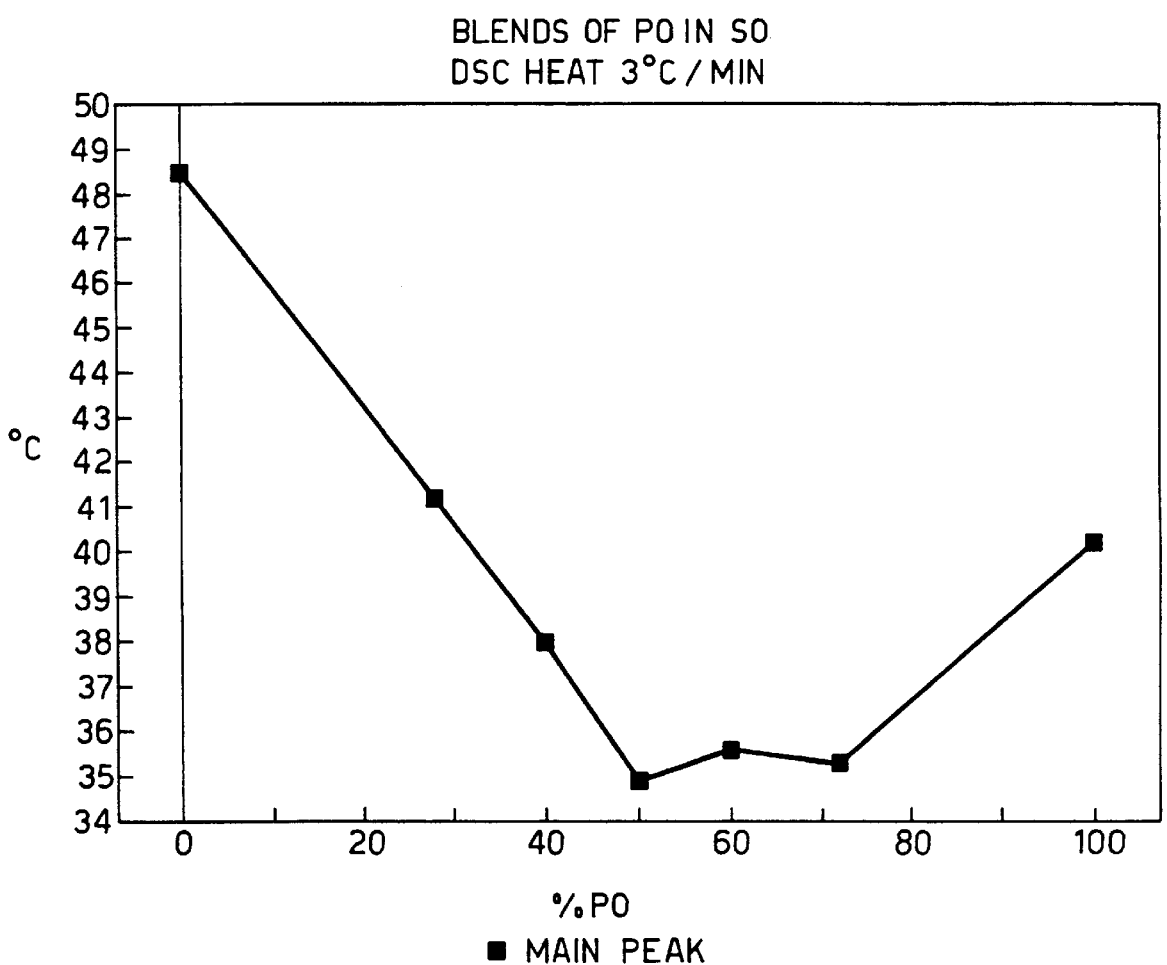

FAT BLENDS CONTAINING DIGLYCERIDES

This application claims benefit of international application PCT/EP95/00386, filed Feb. 2, 1995.

BACKGROUND OF THE INVENTION

In the prior art many fatblends have been disclosed, that are suitable for fat-containing food products, such as:

confectionery products, fillings, cream alternatives, bakery products, cheese, margarines and spreads. In order to be applicable in each of these applications the fats must fulfil a number of criteria, such as they must have a critical plastic consistency, both at refrigeration and at ambient temperature (spreads)

they must be melting readily and completely in the mouth (for all applications)

and nowadays also: they preferably should be healthy (for all applications).

In order to meet the above requirements the fats must have a specific N-profile (solid fat index at different temperatures), while the fats also must have a specific fatty acid composition (i.e.: its FAME). Solutions for the above problem were found for fats based substantially on triglycerides. In most of these fats a structuring compound of the trisaturated type (i.e.: $S_3$, S=saturated fatty acid) or a trans-fat had to be present. However, the presence of these triglycerides $S_3$ or transrich triglycerides is not very beneficial for its healthy character, because it will cause a relatively high level of saturated or trans fatty acids in the fats, which saturated acids are believed to be responsible for heart- and vascular diseases. Therefore, a solution was sought in another direction. In WO 91/08677 a margarine oil is disclosed, that is low in trans fatty acids and low in intermediate chain saturated fatty acids (including $C_{16:0}$) and wherein as a structuring fat 5–15 wt % of fatty acid diglycerides are present. So, the above fats comprise:

84–95 wt % triglycerides
5–15 wt % diglycerides
<3 wt % trans-acids
<6 wt % intermediate chain fatty acids
25–45 wt % $C_{18:2}$
0–11 wt % $C_{18:3}$
5–25 wt % $C_{18:1}$ while the fatty acid residues are non-random distributed, and the fatblend displays a solid fat profile of:

$N_{10}$=7–31
$N_{21}$=3–25
$N_{27}$=0.7–10
$N_{33}$=0.5–4
$N_{39}$<3

The fatty acid composition of the diglycerides is not disclosed. However, from the examples it can be concluded that the diglycerides will be rich in UU-diglycerides, U=$C_{18:1}$ and $C_{18:2}$.

From the above composition it can be calculated that the fats have a theoretically minimum SAFA-content of 37 wt %. Moreover, the requirement for the non-random distribution causes, that the fats can only be obtained along an enzymic route using directing (1.3-specific) enzymes. The diglyceride-content is obtained by adjusting the water content during the enzymic conversion to levels that produce the required amount of 5–15 wt % of diglycerides.

Therefore, the above document does not provide a solution for fats with SAFA-contents below 37 wt %, wherein the fatty acids do not need to be present in a non-randomized way and that can contain higher amounts of diglycerides.

From EP 417 562 fat continuous emulsion are known, having an oil phase and a waterphase in a ratio of 99:1 to 5:95. The oil phase comprises a diglyceride mixture, which is not specified. According to reference example 2 the diglyceride mixture can be obtained by a conversion of glycerine with rapeseed oil in the presence of $Ca(OH)_2$. The product obtained contained 19,4% triglyceride and 79,6 wt % of diglyceride. This mixture was mixed with refined rapeseed oil. Similar oil products could be obtained by starting from palm oil and lard. In order to be able to make fat-continuous emulsions from these mixtures a phospholipid mixture comprising N-free phospholipid and N-containing phospholipid had to be used in a weight-ratio of at least 1,0. Nothing is disclosed about the role of the diglycerides, nor about a lowering of the melting point(s) of higher melting diglycerides.

From EP 378 893 oil/fat-compositions are known, comprising a diglyceride-containing glyceride mixture and a phospholipid with a specific composition. The fats are resistant against oxidation and can be used as cooking, deep frying, pan frying, roasting or baking fat. The oil can contain 5–100% of diglycerides. The fatty acid residues can have a chain length of 8–24 C-atoms, while the content of unsaturated fatty acid residues is up to 70 wt %. The content of SU-diglycerides is up to 40%, the content of SS-diglycerides is up to 5%; the rest being UU-diglycerides. So its content of UU-diglycerides is very high. The glyceride mixture can be obtained by an enzymic conversion of glycerol with an oil high in unsaturated fatty acid residues. Nothing is disclosed about fats having a diglyceride-component with $\geq 70$ wt % SU-diglyceride, which simultaneously contains another component, that decreases the melting point of high melting diglyceride SU.

According to EP 425 958 oil-in-water-in oil emulsions are obtained having on total fat 10–100% of a diglyceride with a melting point below 20° C.

In EP 171 112 edible fat compositions are disclosed that contain 5–30 wt % diglycerides. In the mixtures specific ratios between diglycerides and monoglycerides must be fulfilled, while the level of saturated fatty acids with 16–22 C-atoms in the diglycerides is kept below 45 wt %. According to the specification, the diglycerides have a profound influence on the crystallisation behaviour of fats and have a beneficial effect on the spreadability of hard fats. The diglycerides, therefore, are not used in order to achieve a structuring of the fats; for this purpose quite a high amount of hardened fats are present in the fat blends (according to all examples). As a result of the above the SAFA-level of the total fat blend is still quite high. Moreover, the presence of high melting diglycerides, such as StO or PO, i.e. with a melting point above 40° C., particularly when present in high amounts, will cause problems with the oral response.

SUMMARY OF THE INVENTION

We have studied, whether we could find fat blends, wherein the higher melting diglycerides could be present, whereas their oral response was still good. This study has resulted in the novel fat blends according to our invention. So, our invention concerns fat blends, comprising: 10–60 wt %; preferably 30–55 wt % of diglycerides (=A) and 90–40 wt % of triglycerides (=B), wherein (A) contains at least 70 wt % of diglycerides of the SU-type (S=saturated fatty acid $C_{12}$–$C_{24}$; U=unsaturated fatty acid $C_{16}^+$), including high melting diglycerides (=C) with a melting point above 40° C., while (A) simultaneously contains at least one other fatty component (D), which fatty component (D) is selected, so that the melting point of the mixture (C+D) is at least 5° C. less than the melting point of component (C), and wherein the triglyceride component (B) has a solid fat content (NMR-pulse, not stabilised) at 5° C. of at most 40 ($N_5 \leq 40$), preferably at most 25, most preferably at most 15, while the total blend has a content of saturated fatty acids (=SAFA) of less than 40 wt %, preferably <30 wt % and an $N_{35}$<15.

In the above fat blends the higher melting diglyceride (C) is preferably StO or PO (St=stearic; P=palmitic; O=oleic). These higher melting diglycerides are preferably present in amounts of at least 5 wt %, in particular at least 10 wt % (on diglycerides). However, other diglycerides, such as BO or AO, are also applicable (B=behenic; A=arachidic).

This new finding is based upon the finding that certain mixtures of diglycerides or mixtures of a diglyceride and a triglyceride display a melting point that is lower than the melting point of the higher melting diglyceride. Therefore, diglycerides with a relatively high melting point, which would make them unsuitable for food applications can still be used in these foods, however, only when combined with another fatty component, such as another diglyceride or triglyceride. This enables us to take advantage of the structuring properties of these diglycerides, while the oral response of the fats is also good, because of the lowered melting point of the mixture. The effect can be illustrated by the attached figure I. Herein the melting points of mixtures of PO and SO (P=$C_{16:0}$; S=$C_{18:0}$; O=$C_{18:1}$) as a function of the PO-content (as obtained by DSC) are given. It can be concluded that the melting point of StO is about 48.5° C. and that the melting point of PO is about 41° C., whereas the melting point of a mixture of StO and PO is lower than the melting point of the higher melting StO.

Although the above effect can also be obtained for mixtures of a diglyceride and a triglyceride, we prefer to apply mixtures of two different diglycerides, so that the melting point of the mixture of the higher melting SU and the other fatty component preferably is 30–45° C., most preferably 32–40° C.

DETAILED DESCRIPTION OF THE INVENTION

The mixture of diglycerides (A) that can be used can contain diglycerides of the SS- and SU-type. This means, that they can contain simultaneously one or two saturated fatty acid residues S with 12–24 C-atoms and one or two unsaturated fatty acid residues with at least 16 C-atoms.

The exact position of the residues S and U is not very important. Still we have a preference for the use of 1.3-diglycerides as they have slightly better structuring properties. So, e.g. 1S-2U-diglycerides are as suitable as 1S-3U diglycerides or as 1U-2S-diglycerides. However, we prefer to apply a mixture with a very high content of diglycerides of the type SU, in particular diglycerides with one oleic and with one palmitic acid residue and diglycerides with one oleic and one stearic acid residue. These diglycerides can be present in weight ratios of 5:95–95:5, preferably 20:80–80:20. Our compositions can be made by blending of mixtures of diglycerides, rich in the required diglycerides with triglycerides, in particular liquid triglycerides, such as sunflower oil, olive oil, maize oil, soybean oil, rapeseed oil etc.

The diglycerides can be obtained according to many methods, such as:
1. hydrolysis of triglycerides, this hydrolysis can be performed along a chemical route (using a base) or along an enzymic route.
2. interesterification of glycerol with a triglyceride or an acid. Again a chemical or an enzymic route can be applied.

The starting fatty material for the interesterification with glycerol preferably has a high $S_2U$-content (>40%, in particular >50%). A convenient enzymic route using glycerol and an acid is disclosed in e.g. EP 307,154. In general, the crude products obtained by those routes need to be purified, e.g. removal of monoglycerides by distillation, followed by fractionation.

The above blends can be free of trans acids and free of chemically interesterified fats. However, blends that contain chemically interesterified fat-component can also be applied (either per se or in combination with non-chemically interesterified fats).

Although the triglyceride-component of our blends can be selected from a broad range of triglycerides, provided that the total composition meet our SAFA-requirement (<40%), we prefer to use fats with an $N_5$<40 as our triglyceride-source. Components of those fats are suitably selected from the group consisting of sunflower oil; soybean oil; safflower oil, olive oil, high oleic sunflower oil, maize oil, high oleic safflower oil and olein fractions of vegetable oils, such as palm oil. It is, however, also possible to use fats obtained by enzymic conversion, or olein-fractions obtainable by fractionation (wet- or dry) of enzymically made oils.

The enzymic conversions can be performed using the technology disclosed in our GB 1,577,953. The starting materials should be selected such, that the desired fats or oils are obtained. It is, of course, also possible to use fats that are made according to chemical interesterification-processes (with or without a fractionation step).

Food products that can be made comprise filling fats, enrobed filling fats, confectionery products, wrapper spreads, wrapper margarines, wrapper shortenings, tub spreads, tub margarines, cream alternatives, bakery products, doughs, cheese, mayonnaise and dressings. Each of these food products comprise a fat phase and this fat phase then consists at least partly of the novel fats according to the invention.

It should be understood that for each application the fat blends require a specific N-line. Briefly, it can be said that the following N-requirements must be fulfilled for the application indicated:

filling fat $N_5$>50; $N_{35}$<8
tub spread $N_5$=30–35; $N_{35}$<5
wrapper spread $N_5$=38–45; $N_{35}$<5
bakery products $N_5$>45; $N_{35}$<8
cream alternatives $N_5 \simeq 30$; $N_{35}$<5
confectionery products $N_5$>80; $N_{35}$<8

EXAMPLES 1.1 A mixture of palm oil-midfraction, glycerol and lipolase 100 L-enzyme® (ex NOVO-Nordisk) was converted in a weight-ratio of 100:20:1. The pH was kept at 7,0, using a phosphate buffer. The conversion was performed at 35° C. for 24 hours under stirring.

Excess glycerol was decanted off. Monoglycerides and free fatty acids were removed from the crude reaction product (containing 38,6 wt % of diglycerides and 33,7 wt % of monoglyceride) in a falling film evaporator at 260° C. and 0,3 mm Hg: The product contained 47,8 wt % of diglycerides and 2,1 wt % of monoglycerides.

The product was bleached and deodorised and fractionated from hexane (1,5:1 hexane to oil ratio at 30° C.). The olein was collected (yield 78%) and contained 45,6 wt % of diglycerides.

In a second hexane fractionation, above olein-fraction was fractionated, (3,22:1 hexane to oil ratio at −10° C.); a stearin fraction was obtained. This stearin fraction contained 60 wt % of diglycerides of which 56,7 wt % were of the SU-type. The overall yield from fractionations was 29%. A third fractionation was performed on the stearin fraction obtained (5:1 hexane to oil at 24,5° C.). The olein-fraction was collected, it contained 62 wt % of diglycerides of which 72,5 wt % were SU-diglycerides. The overall yield was 23%.

Excess monoglycerides was removed from the final olein-fraction via a silica-treatment with hexane/acetone (88:12) as solvent (5:1:0,78=solvent:oil:silica). The product was washed with solvent. The resulting product was rich in PO (P=$C_{16:0}$ O=$C_{18:1}$) and contained 61,4% diglycerides and 0,0% monoglycerides.

The diglycerides consisted of 25% SS; 70,7% SU and 4,2% UU.

Its fatty acid composition was: F.F.A.-residue 14:0 16:0 16:1 18:0 18:1 18:2 18:3 20 0,4 50 0,0 7,3 39,3 2,1 0,0 0,6

1.2 Shea-stearin, glycerol, lipolase 100 L® (ex NOVO-Nordisk) were mixed in a weight-ratio of 100:20:1.

The pH was adjusted at 7.0 using a phosphate buffer. The conversion was performed at 40° C. during 8 hours under stirring.

Excess glycerol was decanted off. Monoglycerides and free fatty acids were removed (falling film evaporator 260° C., 0,3 mm Hg).

The resulting product was fractionated from hexane (3:1 hexane:oil; 21° C.). An olein fraction was collected (yield 96% :diglyceride content 22,5 wt %).

In a second hexane-fractionation above olein fraction was fractionated (6,65:1 hexane:oil at −7° C.), the stearin-fraction was collected (18% diglyceride of which 72,6% SU-type). Overall yield 60%. The product was refined by a two-stage silica-treatment. Diglycerides and monoglycerides were adsorbed onto silica (hexane as solvent; ratio hexane:oil:silica=2:1:1,22). The silica-complex was washed with hexane and the wash was discarded.

The silica-complex was washed with hexane/acetone (88/12) in ratio 3,5 wash:1 oil.

The wash was collected. The solvents were removed.

The resulting oil contained 46,8 wt % diglyceride and 0,0% monoglyceride. It's composition was 22% SS, 73,6% SU and 4,4% UU.

The fatty acid composition of the diglycerides was: F.F.A.- residue 14:0 16:0 16:1 18:0 18:1 18:2 18:3 20 0,4 2,3 0,0 57,4 35,9 2,1 0,0 1,9

1.3 A blend was made from sunflower oil, the PO-rich products from example 1.1 and the StO-rich product from example 1.2 (ratio: 71:14,5:14,5). The blend contained 19,6% diglycerides. The diglyceride-composition was:21, 2% SS, 70,3% SU and 8,4% UU.

The fatty acid composition of the total blend was:

F.F.A.-residue 14:0 16:0 16:1 18:0 18:1 18:2 18:3 20 0,2 12,6 0,1 12,5 26,6 46,5 0,0 0,6

Total SAFA: 27,7 wt %.

Solid fat index (NMR-pulse:not stabilised).

| ° C. | N |
|---|---|
| 10 | 18.3 |
| 30 | 3.4 |
| 35 | 3.0 |

2. Preparation of spreads 2.1 40% Fat Spread a. Formulation

| Fat Phase | |
|---|---|
| Fat blend of example 1.3 | 40% |
| Hymono 7804 (Monoglyceride : IV = 80) | 0.3% |
| Colour (β-carotene) | 0.01% |
| Flavour | 0.1% |
| Total | 40.41% |
| Aqueous Phase (to pH 5.1) | |
| Water | 56.5% |
| Skimmed Milk Powder | 1.5% |
| Gelatin (270 bloom) | 1.5% |
| Potassium Sorbate | 0.15% |
| Citric Acid Powder | 0.07% |

All percentages on product basis.

b. Processing

The processing was performed on a microvotator, comprising an ACAC-set up. 3 kg of material was prepared and processed.

The microvotator processing line was set up as follows:

| Premix condition | Stirrer speed 100 rpm Temperature 50° C. |
|---|---|
| Pump | Proportioning pump set at 80% (40.3 g/min). |
| $A_1$ conditions | Shaft speed 1000 rpm Temperature set at 10° C. |
| $C_1$ conditions | Shaft speed 1000 rpm Temperature set to 13° C. |
| $A_2$ conditions | Shaft speed 1000 rpm Temperature set to 12° C. |
| $C_2$ conditions | Shaft speed 1000 rpm Temperature set to 15° C. |

The aqueous phase was prepared by heating the required amount of water to approximately 80° C. and then, using a Silverson mixer, slowly mixing in the ingredients. The pH of the system was adjusted to 5.1 by adding 20% lactic acid solution as required.

A premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

Typical exit temperatures from the units were:

| A1 | 15.0° C. |
|---|---|
| C1 | 17.1° C. |
| A2 | 16.5° C. |
| C2 | 16.6° C. | c. Evaluations

Products were collected from both of the C-units. Very good oil continuous low fat spreads were produced using this system. Hardness C and conductivity of the products were measured.

| Product (40% fat) | C-value @ 5° C. (gcm$^{-2}$) | C-value @ 20° C. (gcm$^{-2}$) | Conductivity @ 5° C. (µScm$^{-1}$) | Conductivity @ 20° C. (µScm$^{-1}$) |
|---|---|---|---|---|
| ex $C_1$ | 1180 | 190 | $10^{-4}$ | $10^{-4}$ |
| ex $C_2$ | 1400 | 210 | $10^{-4}$ | $10^{-4}$ |

All products had a good oral melt down and were fat-continuous.

2.2 80% Fat Spread a. Formulation

| Fat Phase | |
|---|---|
| Fat blend of example 1.3 | 80% |
| Hymono 7804 | 0.3% |
| Flavour | 0.1% |
| Colour (β-carotene) | 0.01% |
| Aqueous Phase (to pH 5.1) | |
| Water | 18.3% |
| Gelatin (270 bloom) | 0.5% |
| Skimmed Milk Powder | 0.5% |
| Potassium Sorbate | 0.05% |
| Citric Acid Powder | 0.025% |

All percentages on product basis.

b. Processing

Identical conditions were used for the preparation and processing as for the 40% fat spread.

Exit temperatures for this run were typically:

| A1 | 15.3° C. |
|---|---|
| C1 | 15.9° C. |
| A2 | 15.7° C. |
| C2 | 15.6° C. |

As before, oil continuous product could successfully be obtained at any point after C-unit 1.

Product was collected ex C1 and C2 for storage and evaluation.

c. Evaluation

| Product (80% fat) | C-value @ 5° C. (gcm$^{-2}$) | C-value @ 20° C. (gcm$^{-2}$) | Conductivity @ 5° C. ($\mu$Scm$^{-1}$) | Conductivity @ 20° C. ($\mu$Scm$^{-1}$) |
|---|---|---|---|---|
| ex C$_1$ | 1820 | 200 | 10$^{-5}$ | 10$^{-5}$ |
| ex C$_2$ | 2100 | 180 | 10$^{-5}$ | 10$^{-5}$ |

All products were oil continuous with a good oral meltdown.

3. Preparation of a filling

Recipes

Fillings were made according to the following recipe:

| | % |
|---|---|
| Sugar | 45 |
| Cocoa powder N-11-N | 7 |
| Skimmed milk powder | 10 |
| Fat | 38 |
| Lecithin | 0.5 |

The fats used were:
1. Blend of an interestified fat and palm oil olein in ratio 5:95, known as Biscuitine SF®.
2. Fat of example 1.3.

The SAFA content of the fats was:
1. Biscuitine SF: 40%
2. Fat example 1.3: 27,7%

The fillings were made using a Hobart mixer, Bühler refiner and Pascal conche.

Evaluation

Filling 1 was cooled to 22.5° C. and filling 2 was cooled to 19.5° C., before they were piped into aluminum cups. The aluminum cups were stored at 20° C. and 25° C. The fillings were evaluated on:

Hardness

The STA-hardness of the fillings was determined after one day storage at 20° C. and 25° C. The results were:

Method:

Cone: 60°

Depth: 2 mm

Speed: 0.5 mm/sec

20° C.
  Filling 1: <2 gr
  Filling 2: 32 gr

25° C.
  Filling 1: <2 gr
  Filling 2: 12 gr

Sensory evaluation

The fillings were evaluated by the taste panel after storage at 20° C.

Filling 2 was much harder than filling 1. Filling 2 had a slightly slower and lower flavour release probably because it was harder.

Conclusion

Although the SAFA content of the diglyceride based filling was lower, the product was much harder and had better body.

We claim:

1. A fat blend suitable for food products comprising:

10–60 wt % of diglycerides (A) and 90–40 wt % of triglycerides (B)

wherein (A) comprises at least 70 wt % of diglycerides of the SU-type wherein S stands for saturated $C_{12}$–$C_{24}$ fatty acid and U stands for unsaturated fatty acid of at least 16 C atoms, including high melting diglyceride component (C) with a melting point above 40° C. and wherein (A) also contains at least one other diglyceride or triglyceride component (D) selected so that the melting point of the mixture of C and D is at least 5° C. lower than the melting point of commponent (C), and wherein the triglyceride component (B) has a solid fat content (NMR-pulse, not stabilized) at 5° C. of at most 40 ($N_5 \leq 40$), the total fat blend having a content of saturated fatty acids SAFA of less than 40 wt % and an $N_{35}$<15.

2. A fat blend according to claim 1, wherein the higher melting diglyceride (C) is StO or PO, wherein St=stearic acid, P=palmitic acid, O=oleic acid.

3. A fat blend according to claim 1, wherein the higher melting diglyceride (C) is present in the diglyceride component (A) at least 5 wt %.

4. A fat blend according to claim 1, wherein the other fatty component (D) is a diglyceride of the SU-type, which is different from the higher melting diglyceride (C).

5. A fat blend according to claim 1, wherein diglyceride (C) is StO and diglyceride (D) is PO, which are present in diglyceride mixture (A) in a ratio of 80:20–20:80.

6. A fat blend according to claim 1, wherein the diglyceride component is the product of glycerolysis of a triglyceride mixture, having >40 wt % of $S_2U$-triglycerides, followed by a monoglyceride removal and a fractionation.

7. A fat blend according to claim 1, wherein parts of the triglycerides (B) are selected from the group consisting of sunflower oil soybean oil safflower oil, olive oil, maize oil, high oleic sunflower oil, high oleic safflower oil and olein fractions of vegetable oils.

8. A fat blend according to claim 1, wherein the diglycerides (A) and triglycerides (B) are free of trans fatty acid residues and free of chemically interesterified fats.

9. Food products selected from the group consisting of filling fats enrobed filling fats confectionery products, wrapper spreads, wrapper margarines, wrapper shortenings, tub spreads, tub margarines, cream alternatives, bakery products, doughs, cheese, mayonnaise and dressings, which products comprise a fat phase, wherein the fat phase at least partly consists of the fat blend according to claim 1.

10. A fat blend according to claim 1, which comprises 30–55 wt % diglycerides A and which has a fat solids content (NMR-pulse, not stabilized) at 5° C. of at most 25.

11. The fat blend of claim 1, in the form of a fat continuous emulsion with water.

12. A fat continuous emulsion according to claim 11 comprising up to 80% by weight of the fat blend.

* * * * *